(12) United States Patent
Nishiwaki et al.

(10) Patent No.: US 8,807,851 B2
(45) Date of Patent: Aug. 19, 2014

(54) ELECTRONIC DEVICE

(75) Inventors: Kenya Nishiwaki, Yokohama (JP);
Yoichi Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/450,234

(22) Filed: Apr. 18, 2012

(65) Prior Publication Data
US 2012/0268871 A1  Oct. 25, 2012

(30) Foreign Application Priority Data

Apr. 22, 2011 (JP) .................................. 2011-096225
Apr. 22, 2011 (JP) .................................. 2011-096226

(51) Int. Cl.
*G03B 17/00* (2006.01)
(52) U.S. Cl.
USPC ............................................................ 396/448
(58) Field of Classification Search
USPC .......................................... 396/448; 359/511
See application file for complete search history.

(56) References Cited

U.S. PATENT DOCUMENTS

| 6,135,652 A * | 10/2000 | Owashi et al. ............... 396/448 |
| 6,347,893 B1 * | 2/2002 | Shiono et al. ................ 396/448 |
| 2009/0252487 A1 * | 10/2009 | Matsumoto ................... 396/448 |
| 2010/0239242 A1 * | 9/2010 | Ka et al. ........................ 396/448 |
| 2011/0097071 A1 * | 4/2011 | Karlsson et al. ............. 396/448 |

FOREIGN PATENT DOCUMENTS

| JP | 9-185102 A | 7/1997 |
| JP | 2003-121903 A | 4/2003 |

* cited by examiner

*Primary Examiner* — Christopher Mahoney
(74) *Attorney, Agent, or Firm* — Canon USA Inc IP Division

(57) ABSTRACT

An electronic device comprising a front cover which covers a front face excluding an aperture of an apparatus in a fixed state to the apparatus, a barrier cover configured to cover the aperture, an attachment unit which attaches the barrier cover to the front cover so that the barrier cover can move, and a locking unit that locks the front cover in a forward protruding state when the barrier cover is in an open state, attachment unit positions the barrier cover at a first position when the barrier cover is in a closed state, and guides the barrier cover to a second position protruding forward from the front cover, and then guides the barrier cover to a third position at which the barrier cover is locked by the locking unit, and moving the barrier cover from the third position.

22 Claims, 16 Drawing Sheets

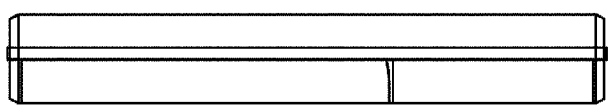
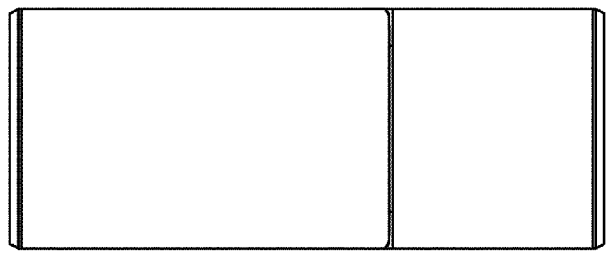
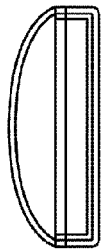

FIG.3A1
FIG.3A2
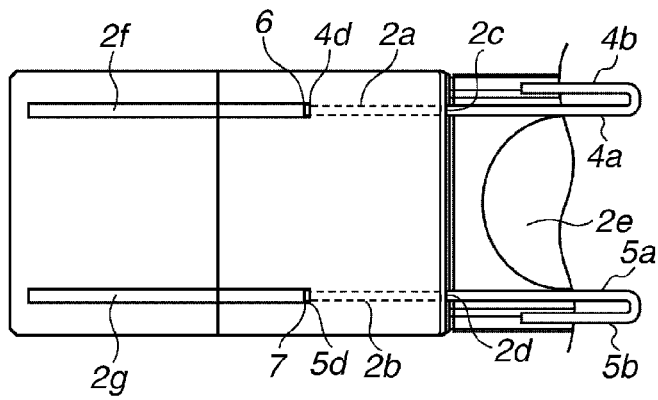
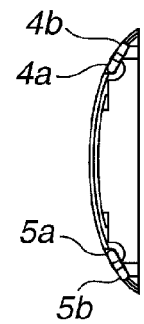
FIG.3B1
FIG.3B2
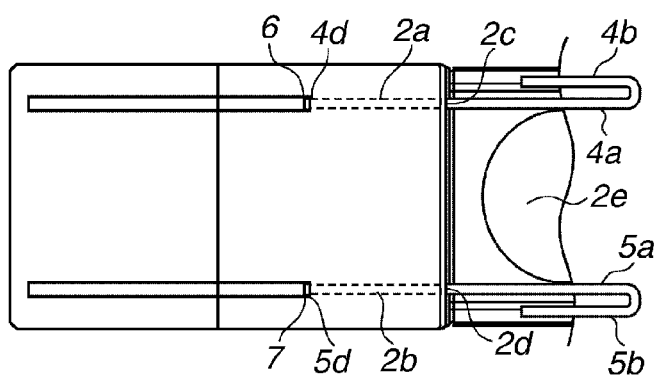
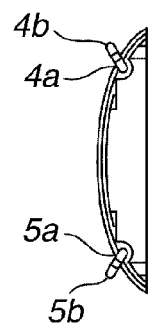
FIG.3C1
FIG.3C2
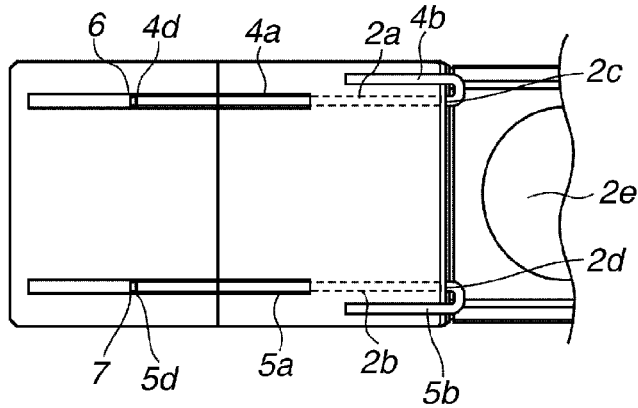
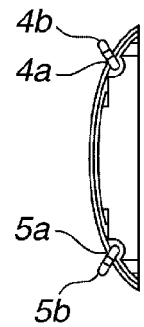

FIG.4A1
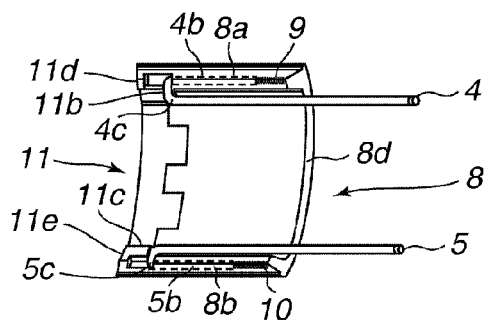
FIG.4A2
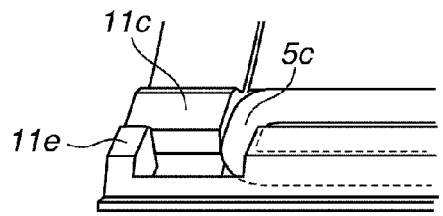
FIG.4B1
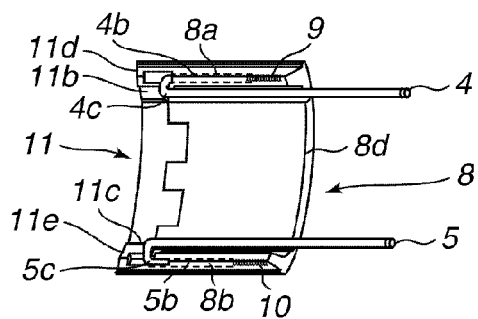
FIG.4B2
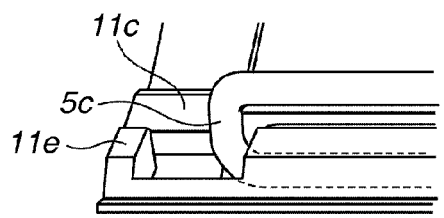
FIG.4C1
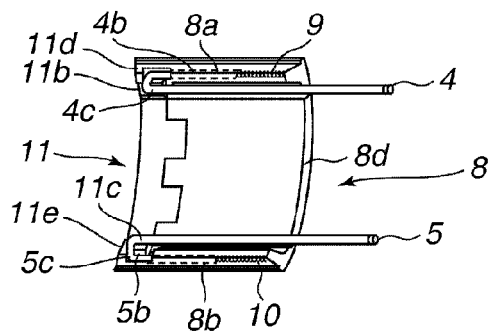
FIG.4C2
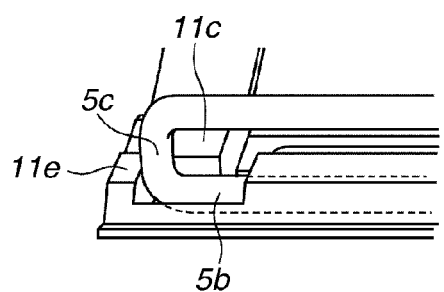

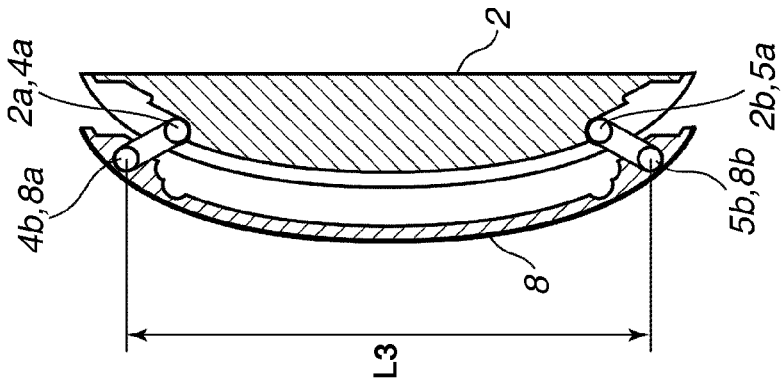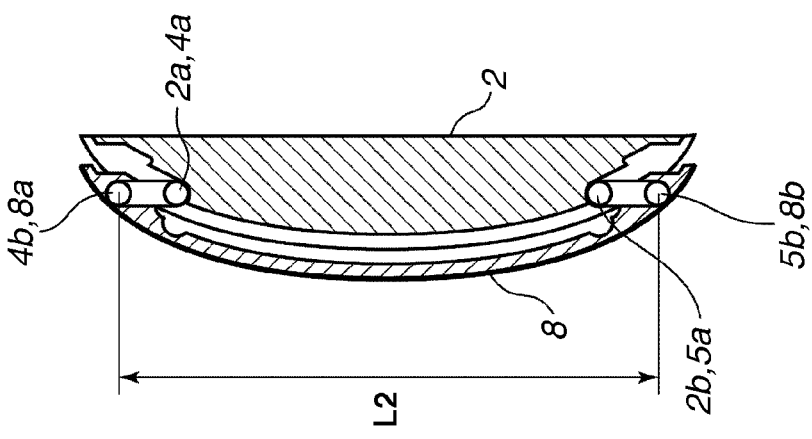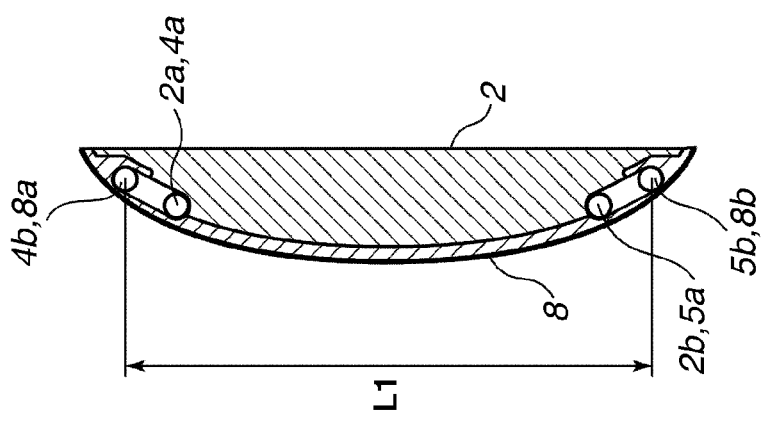

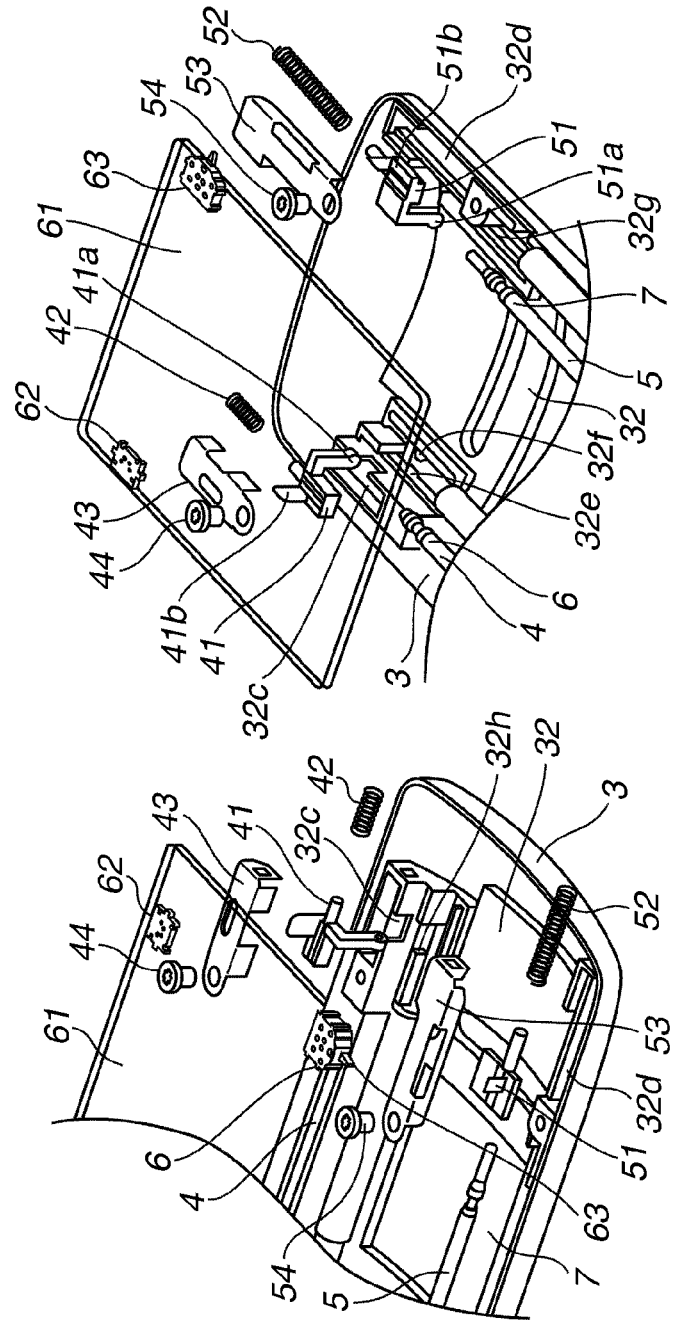

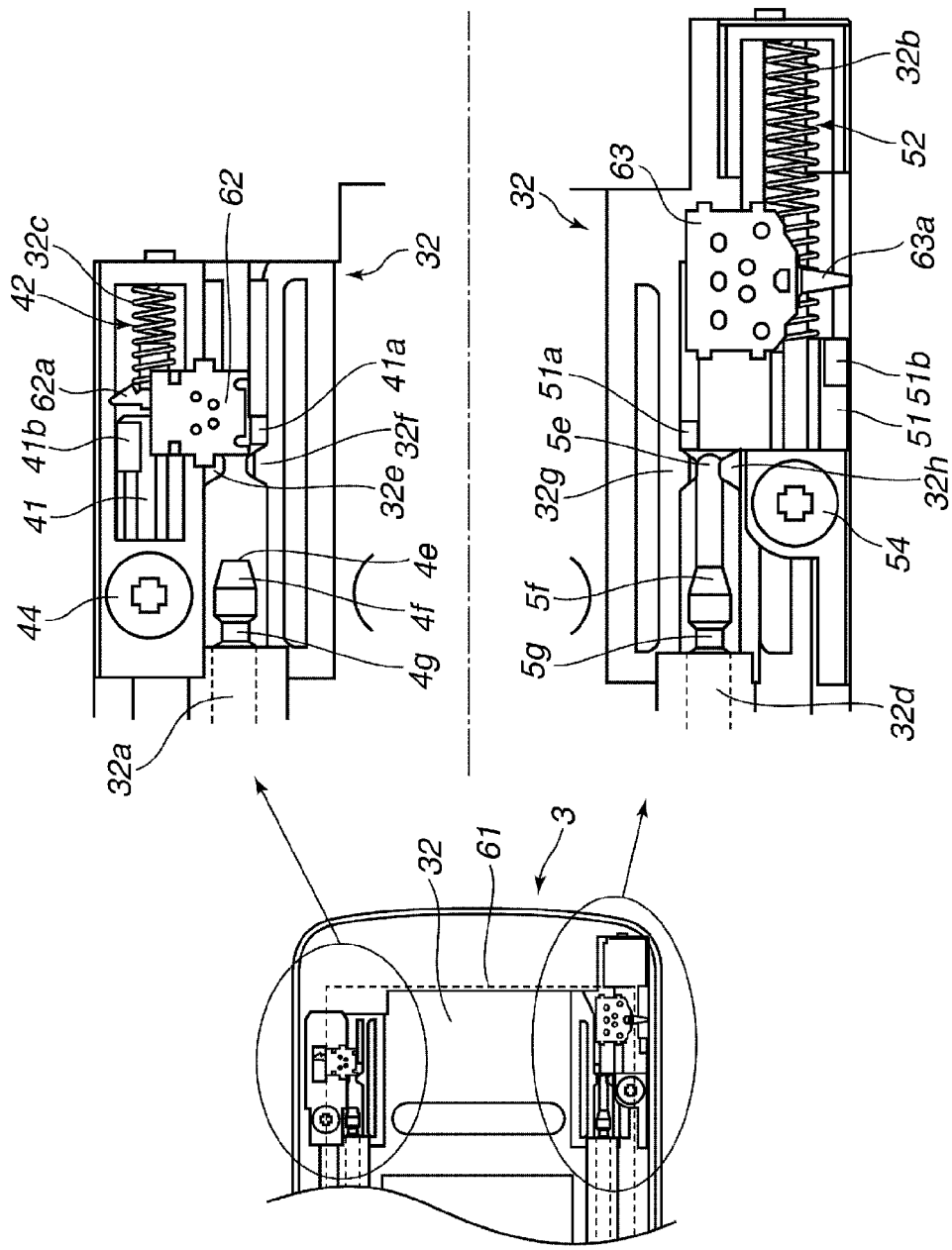

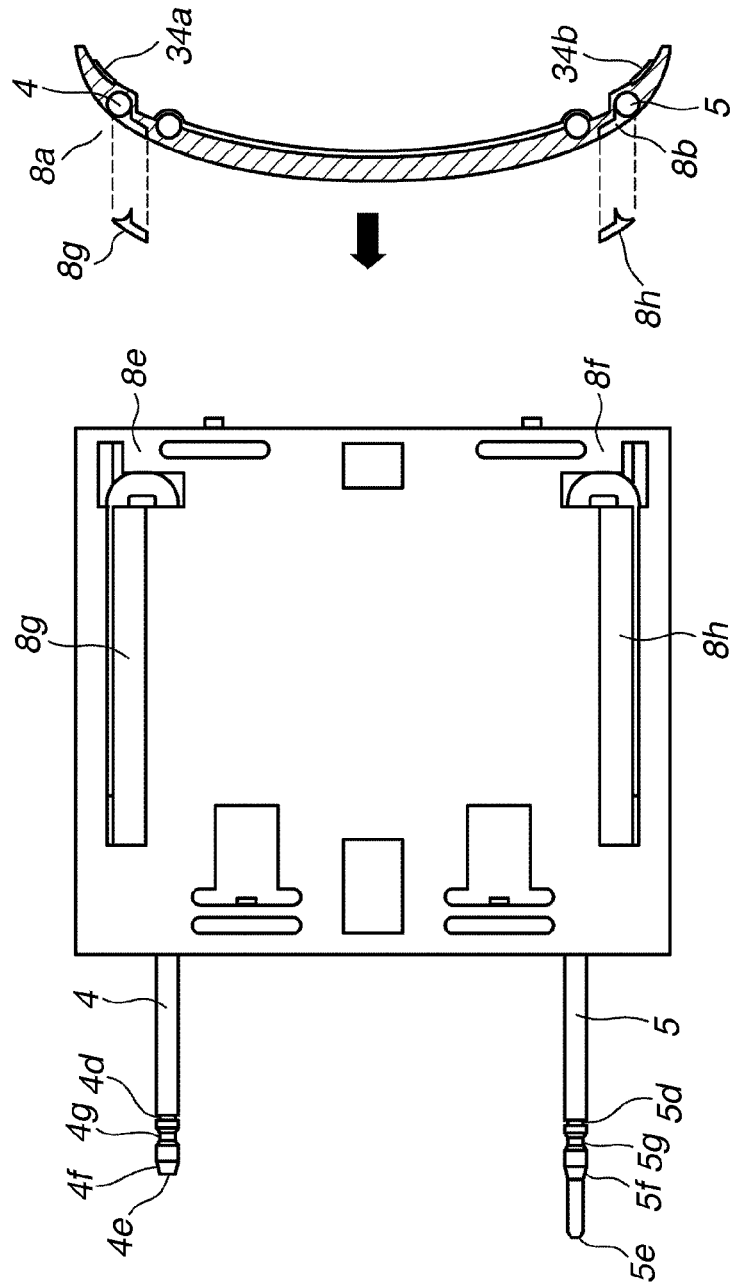

ELECTRONIC DEVICE

BACKGROUND OF THE INVENTION

1. Field of the Invention

The present disclosure relates to an electronic device having a barrier cover that can open and close.

2. Description of the Related Art

In a compact electronic device having precision parts inside, such as a camera, to protect the internal mechanisms when carried around in a non-usage state, an openable and closable barrier cover that covers the external face of the device is provided to protect and prevent dust from entering. Such an openable and closable barrier cover often also plays other important roles, such as maintaining the aesthetics of the device and increasing the design quality.

Japanese Patent Application Laid-Open No. 2003-121903 discusses a device in which a barrier cover can maintain a stable attached state without rising up from the camera external surface, because the barrier cover is constantly supported across a broad width in a sliding direction by upper and lower rails.

Japanese Patent Application Laid-Open No. 9-185102 discusses a device that is designed so that when the barrier cover is at an open position, the barrier cover latches onto a latching claw provided on a camera front face so that it does not rise up.

Although the method discussed in Japanese Patent Application Laid-Open No. 2003-121903 has excellent stability, the barrier cover rises above the camera surface even at a closed position. The sliding section is constantly exposed to the external side, which tends to harm aesthetics. Further, when external pressure is applied, the sliding section tends to break. In addition, dust and foreign objects can easily enter the sliding section, which harms the sliding action of the barrier cover. In addition, a detection unit for detecting that the barrier cover has been opened can be seen when the barrier cover is open, so that the appearance quality deteriorates.

Further, in the method discussed in Japanese Patent Application Laid-Open No. 9-185102, since the barrier cover is supported by only a pinion shaft, rattling tends to occur due to the barrier cover wobbling about the gear shaft. Consequently, when the barrier cover is fully open, the barrier cover tends to rise up onto the latching claw, which is for preventing rising up. Further, the mechanism is complex and the number of parts is large, which makes this method unsuitable for reducing the size of a device.

SUMMARY OF THE INVENTION

The present disclosure is directed to a device or a method capable of increasing the integrated feeling of a barrier cover and a front cover in a closed state, and that can be strong against external pressure.

According to an aspect of the disclosed herein, an electronic device includes a front cover configured to cover a front face and excluding an aperture of an apparatus in a fixed state to the apparatus, a barrier cover movable between an open state and a close state and configured to cover the aperture, an attachment unit configured to attach the barrier cover to the front cover so the barrier cover moves in a forward direction and in a lateral direction, and a locking unit configured to lock the front cover in a forward protruding state when the barrier cover is in an open state, wherein the attachment unit is configured to position the barrier cover at a first position forming a continuous face with the front cover when the barrier cover is in a closed state, and guide the barrier cover to a second position protruding forward from the front cover resulting from an application of an external force on the barrier cover in a forward direction, guiding the barrier cover to a third position at which the barrier cover is locked by the locking unit, and moving the barrier cover from the third position in the lateral direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles disclosed herein.

FIGS. 1A, 1B, and 1C are external views illustrating a camera according to a first exemplary embodiment.

FIGS. 3A1, 3A2, 3B1, 3B2, 3C1 and 3C2 illustrate operation of a barrier cover and a shaft.

FIGS. 4A1, 4A2, 4B1, 4B2, 4C1, and 4C2 are rear views illustrating operation of a barrier cover and a shaft.

FIGS. 6A, 6B, and 6C are cross-sectional views illustrating barrier cover movement.

FIGS. 11A and 11B are enlarged exploded views of the third exemplary embodiment.

FIG. 12 is an enlarged front view illustrating a switch and its vicinity.

FIGS. 16A and 16B illustrate a barrier cover in detail.

DESCRIPTION OF THE EMBODIMENTS

Various exemplary embodiments, features, and aspects will be described in detail below with reference to the drawings.

A first exemplary embodiment will now be described. FIGS. 1A to 1C are external views of a camera 1 according to the first exemplary embodiment of the imaging apparatus according to the present invention. The camera 1 has a horizontally long, flat shape as illustrated in the trihedral figure of FIGS. 1A to 1C, and when viewed from the side, has a front face 1a that curves in an arc-shape like in FIG. 1C.

Figure 2:
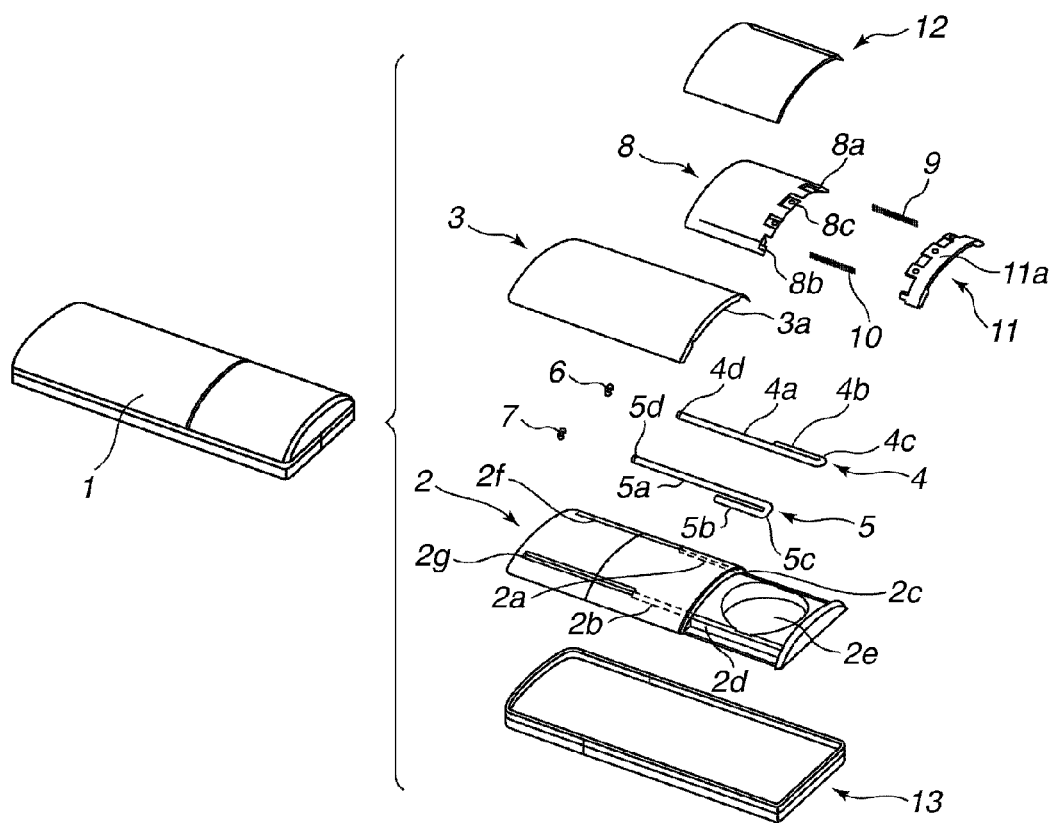
FIG. 2 is an exploded view of the first exemplary embodiment.

FIG. 2 illustrates an exploded view of the camera 1. A front cover 2, which is formed from a resin material, covers a front half section of the camera 1. The front cover 2 includes long-dimension bearings 2a and 2b, long-dimension bearing entrances 2c and 2d, a lens aperture 2e, and guide grooves 2f and 2g, which are in communication with the long-dimension bearings 2a and 2b. Next, a front metal piece 3, which is formed by drawing sheet metal of stainless steel, for example, is adhered to and made to cover a front face of the front cover 2. A beveled face 3a slants toward the lens aperture 2e of the front cover 2.

Next, shafts 4 and 5 are attached to the front cover 2 so that a barrier cover can move in a forward and a lateral direction. The shafts 4 and 5, which have the same shape, are positioned at an upper and a lower edge of the front cover 2 and the barrier cover. Further, the shafts 4 and 5 are a rod material that has a circular cross-section formed from the same material. The shafts 4 and 5 are bent at folded-back sections 4c and 5c to form a shape that is roughly like the letter "J", so that the long-dimension shaft members 4a and 5a and short-dimension shaft members 4b and 5b are positioned parallel to each other. The terms "long-dimension" and short-dimension" used throughout this specification may be understood by the skilled artisan to mean having a longer dimension, or length, and having a shorter dimension, or length, respectively. Fastening grooves 4d and 5d are provided at the tips of the long-dimension shaft members 4a and 5a.

The long-dimension shaft members 4a and 5a of the shafts 4 and 5 are inserted into the long-dimension bearings 2a and 2b of the front cover 2 so that they are supported in a manner that allows them to slide in a lateral direction. Fastening rings 6 and 7 are inserted into the fastening grooves 4d and 5d that peep from the guide grooves 2f and 2g. Consequently, the shafts 4 and 5 can be attached in a state that allows them to rotate around the long-dimension shaft members 4a and 5a with respect to the front cover 2, and slide, in the axis direction, a distance calculated by subtracting the length of the long-dimension bearings 2a and 2b from the length from the folded-back sections 4c and 5c to the fastening rings 6 and 7.

FIGS. 3A1 to 3C1 are front views in which the shafts 4 and 5 are attached to the front cover 2. FIGS. 3A2 to 3C2 are side views in which the shafts 4 and 5 are attached to the front cover 2. For ease of description, these drawings illustrate a half cutaway view of the lens aperture 2e. The shafts 4 and 5 is rotatable as illustrated in FIGS. 3A1, 3A2, 3B1, and 3B2 when the short-dimension shaft members 4b and 5b have been slid over to the front face side of the lens aperture 2e by the action of a below-described locking mechanism. Further, the shafts 4 and 5 is slidable as illustrated in FIGS. 3B1, 3B2, 3C1, and 3C2 when the shaft members 4b and 5b have been rotated to rise from the front cover 2. This will be described in more detail below.

Next, a barrier cover 8, which is formed from an elastic resin material, covers the front face of the lens aperture 2e so that it can open and close. The overall barrier cover 8 forms an arc shape with the same curved face as the front cover 2 when viewed from the side face in a closed state, and short-dimension bearings 8a and 8b are provided thereto. Springs 9 and 10 are inserted into the short-dimension bearings 8a and 8b, and the short-dimension shaft members 4b and 5b of the shafts 4 and 5 are also inserted therein. Next, the shafts 4 and 5 are regulated by a stopper member 11 so that the shafts 4 and 5 do not disengage from the short-dimension bearings 8a and 8b by being pressed by the springs 9 and 10. The stopper member 11 is formed from a resin material and has an overall arc-shaped structure similar to the barrier cover 8. An attachment claw 8c of the barrier cover 8 catches on an attachment portion 11a, and is bonded and fixed thereto.

The locking mechanism (locking means) of the shafts 4 and 5 to the barrier cover 8 will now be described. FIGS. 4A1 to 4C2 are rear views in which the shafts 4 and 5 are attached to the barrier cover 8. Although normally the springs 9 and 10 cannot be seen because they are in the short-dimension bearings 8a and 8b, for illustrative purposes the springs 9 and 10 are shown. First, FIGS. 4A1 and 4A2 illustrate a state when the barrier cover 8 is closed and correspond to FIGS. 3A1 and 3A2. FIG. 4A2 is an enlarged view of the folded-back section 5c vicinity (folded-back section 4c exhibits the same behavior). At this stage, the folded-back sections 4c and 5c of the shafts 4 and 5 that are pressed by the springs 9 and 10 abut and are latched to first abutment portions 11b and 11c of the stopper member 11.

Next, the barrier cover 8 is made to rise, so that when the barrier cover 8 is in the state illustrated in FIGS. 4B1 and 4B2, since the shafts 4 and 5 rotate in the above-described manner, the folded-back sections 4c and 5c disengage from the first abutment portions 11b and 11c of the stopper member 11. FIG. 4B2 illustrates a state in which the folded-back section 5c has disengaged from the first abutment portion 11c (this is the same for the folded-back section 4c). When disengaged, the shafts 4 and 5 laterally move until the folded-back sections 4c and 5c abut second abutment portions 11d and 11e of the stopper member 11 owing to an urging force from the springs 9 and 10, as illustrated in FIGS. 4C1 and 4C2. In this state, since the first abutment portions 11b and 11c regulate the rotation of the folded-back sections 4c and 5c, the shafts 4 and 5 cannot rotate back to the state illustrated in FIGS. 4A1 and 4A2. Specifically, when the barrier cover 8 rises from the state illustrated in FIGS. 4A1 and 4A2 to the state illustrated in FIGS. 4B1 and 4B2, the barrier cover 8 automatically moves to the state illustrated in FIGS. 4C1 and 4C2 due to an urging force from the springs 9 and 10, and remains in a raised state that cannot be made to go back.

In the first exemplary embodiment, the second abutment portions 11d and 11e have a greater height from the rear face of the stopper member 11 than the first abutment portions 11b and 11c. Specifically, the first abutment portions 11b and 11c and the second abutment portions 11d and 11e form a step shape. This is because, as illustrated in FIG. 4A2, the height required for latching when the folded-back sections 4c and 5c are abutting the second abutment portions 11d and 11e needs to be greater by that folded-back section amount than when the folded-back sections 4c and 5c abut the first abutment portions 11b and 11c. However, if the folded-back sections 4c and 5c are properly latched to the second abutment portions 11d and 11e, the second abutment portions 11d and 11e may have the same height as the first abutment portions 11b and 11c.

Further, a beveled face 8d is provided roughly parallel with the beveled face 3a provided on the front metal piece 3. Further, a barrier metal piece 12, which is formed by drawing sheet metal of stainless steel, for example, is adhered to and made to cover a front face of the barrier cover 8 and the stopper member 11.

Finally, a rear cover 13 is combined with the front cover 2 and covers the rear half section of the camera 1. Although a lens unit and other structural parts configuring the camera 1 are housed in that section, a description of those units will be omitted here. The camera 1 according to the first exemplary embodiment is thus configured as described above.

Figure 5A:
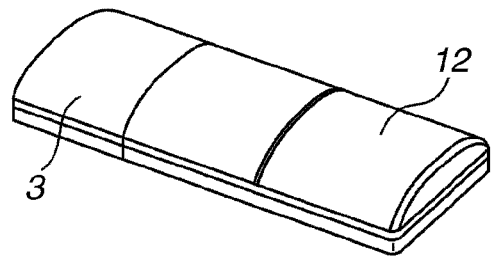
FIGS. 5A, 5B, 5C, and 5D are perspective views illustrating barrier cover movement.

Next, the operations for opening and closing the barrier cover 8 of the camera 1 will be described with reference to FIGS. 5A to 5D. FIG. 5A illustrates a closed state of the barrier cover 8. In this closed state, the barrier cover 8 is positioned at a first position that forms a continuous face with the front cover 2. From this state, the barrier metal piece 12 and the barrier cover 8 are pulled in a forward direction by an external force in the forward direction to protrude forward from the front cover 2. Then, the short-dimension shaft members 4b and 5b are rotated about the long-dimension shaft members 4a and 5a by a pulling force, and the barrier metal piece 12 and the barrier cover 8 rise from the lens aperture 2e, so that the shafts 4 and 5 are positioned at a second position illustrated in FIG. 5B.

FIGS. 6A to 6C illustrate the state of the barrier cover 8 at this point. FIG. 6A illustrates a closed state of the barrier cover 8, in which a distance between the short-dimension shaft members 4b and 5b of the shafts 4 and 5 at this point is L1. FIG. 6B illustrates a state in which the barrier cover 8 has risen until an intermediate position, in which a distance L2 between the short-dimension shaft members 4b and 5b is greater than L1. Since the barrier cover 8 and the stopper member 11 have an overall arc shape as described above, the distance to bowed short-dimension bearings 8a and 8b can be extended. Further, at the state illustrated in FIG. 6C, in which the barrier cover 8 has completely risen, a distance L3 between the short-dimension shaft members 4b and 5b is about the same as L1. Owing to the springiness resulting from this bowing, a restoring force for returning to a L3=L1 state, i.e., the restoring force for moving from the intermediate position to the first or the second position, is obtained, so that the configuration is stable.

Figure 5B:
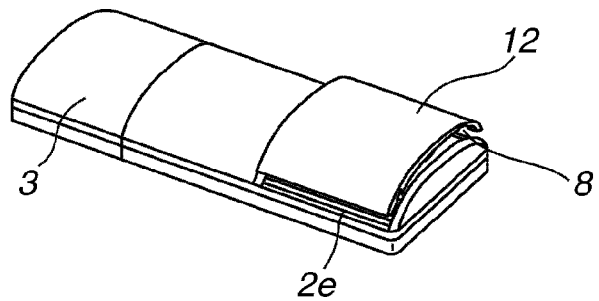
Figure 5C:
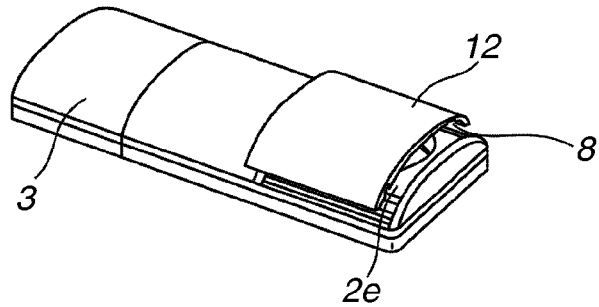

When the barrier cover 8 has risen up and reached the second position illustrated in FIG. 5B, as described based on FIGS. 4A1 to 4C2, the locking mechanism of the shafts 4 and 5 acts on the barrier cover 8, so that the barrier cover 8 is maintained in a raised state like that illustrated in FIGS. 4C1 and 4C2, and cannot be closed even if the surface of barrier metal piece 12 is pressed. Further, at this point, since the fastening rings 6 and 7 are abutting the long-dimension bearings 2a and 2b as illustrated in FIG. 3B1, the barrier cover 8 is laterally slid by the urging force from the springs 9 and 10, so that the shafts 4 and 5 are at a third position illustrated in FIG. 5D.

Figure 5D:
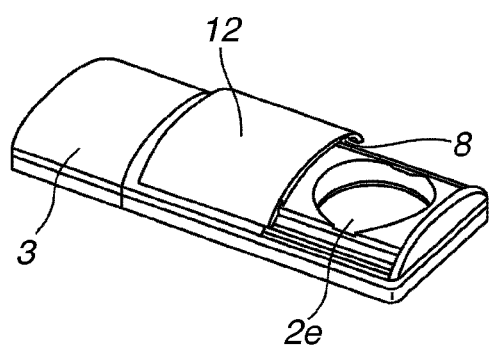

Subsequently, if the barrier metal piece 12 is laterally slid, the long-dimension shaft members 4a and 5a of the shafts 4 and 5 slide along the long-dimension bearings 2a and 2b, so that the barrier cover 8 can move from the front face of the lens aperture 2e to the front face of the front metal piece 3. This means that a much larger movement amount can be obtained than a conventional mechanism, since as illustrated from FIGS. 3B1 and 3B2 to FIGS. 3C1 and 3C2, the folded-back sections 4c and 5c of the shafts 4 and 5 can be moved until they abut the long-dimension bearing entrances 2c and 2d. Further, during this operation, since the above-described locking mechanism maintains the barrier cover 8 in the locked state illustrated in FIGS. 4C1 and 4C2, the rear face of the barrier cover 8 does not hit the front metal piece 3 even if the front face of the barrier metal piece 12 is pressed during the sliding operation. FIG. 5D illustrates an open state of the barrier cover 8.

As another opening method, the barrier metal piece 12 may be laterally slid from the beginning, without pulling the barrier metal piece 12 from the state illustrated in FIG. 5A. In this case, a beveled face 8d provided at the rear of the barrier cover 8 abuts the beveled face 3a of the front metal piece 3, so that the barrier cover 8 rises at a slope along the beveled face 3a, thereby directly reaching the state illustrated in FIG. 5C from FIG. 5A without going through the state illustrated in FIG. 5B. Subsequently, the barrier metal 12 can be directly opened by laterally slid further across. Specifically, operability is very good, as the barrier cover 8 can be moved from the front face of the lens aperture 2e to the front face of the front metal piece 3 just by laterally sliding the barrier metal piece 12.

Next, when closing the barrier cover 8, in the reverse of the above, the barrier metal piece 12 is laterally slid to move the barrier cover 8 from the front face of the front metal piece 3 to the front face of the lens aperture 2e. Further, since the locking mechanism is maintained until midway through this operation, the front face of the barrier metal piece 12 does not sink down. Then, when the barrier cover 8 reaches the state illustrated in FIG. 5C, since the fastening rings 6 and 7 abut the long-dimension bearings 2a and 2b as illustrated in FIG. 3B, the shafts 4 and 5 cannot be slid any further, so only the barrier cover 8 moves, and reaches the state illustrated in FIG. 5B. Consequently, the state of the shafts 4 and 5 with respect to the barrier cover 8 changes from that illustrated in FIGS. 4C1 and 4C2 to that in FIGS. 4B1 and 4B2, so that the folded-back sections 4c and 5c can no longer pass over the first abutment portions 11b and 11c, and the lock is released. From this stage, the barrier cover 8 can be closed by pressing the barrier metal piece 12 and the barrier cover 8 toward the lens aperture 2e, so that the barrier cover 8 returns to the state illustrated in FIG. 5A.

Based on the above configuration, in the first exemplary embodiment, when the barrier cover 8 is closed the barrier cover 8 can be formed integrally with the front cover 2 to maintain the housing front face, so that a clean and tidy appearance that is free from mechanical parts sticking out can be maintained. Further, to hide the internal mechanisms, the width of the "overlap portion", where the barrier cover 8 always covers the front face of the housing even when open or closed, can be reduced to just the amount that covers the folded-back sections 4c and 5c of the J-shaped shafts 4 and 5. This enables the movement amount of the barrier cover 8 to be greatly increased over that in the conventional example. Further, compared with the conventional example, the structure is more simple, takes up less space, and uses fewer parts, and can thus house more structural parts in a limited space. In addition, since the barrier cover 8 is locked when it rises from the housing, while laterally sliding the barrier cover 8, the barrier cover 8 can maintain a raised state from the front face of the front cover 2 even when pressed from the front.

A camera 21 according to a second exemplary embodiment of the present invention will now be described. The camera 21 adds a mechanism to the first exemplary embodiment which improves operability and stability. Parts that are the same as the first exemplary embodiment are denoted with the same reference numerals, and parts that are new in the second exemplary embodiment are denoted with new reference numerals.

Figure 7C:
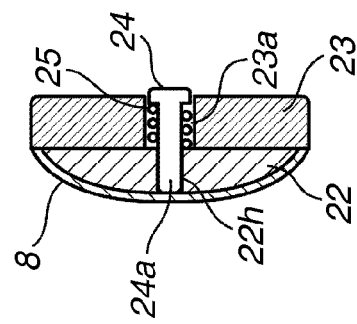
FIGS. 7A, 7B, and 7C are external views illustrating a camera according to a second exemplary embodiment of the present invention.
Figure 7B:
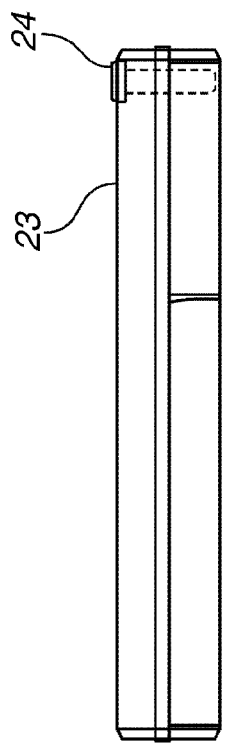
Figure 7A:
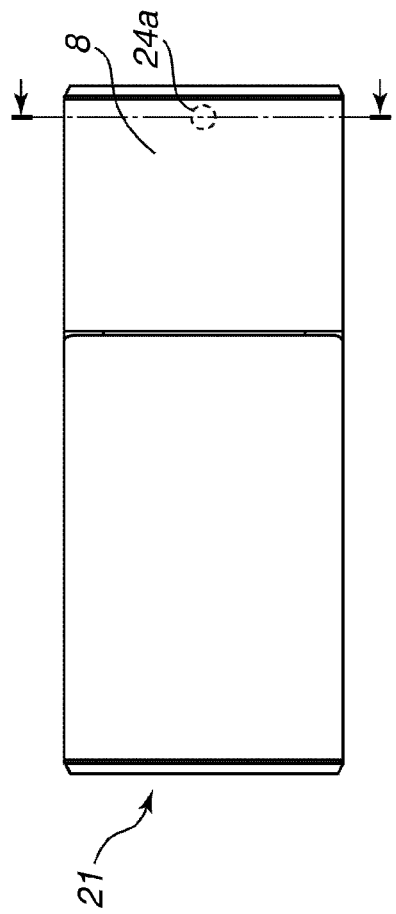
Figure 8:
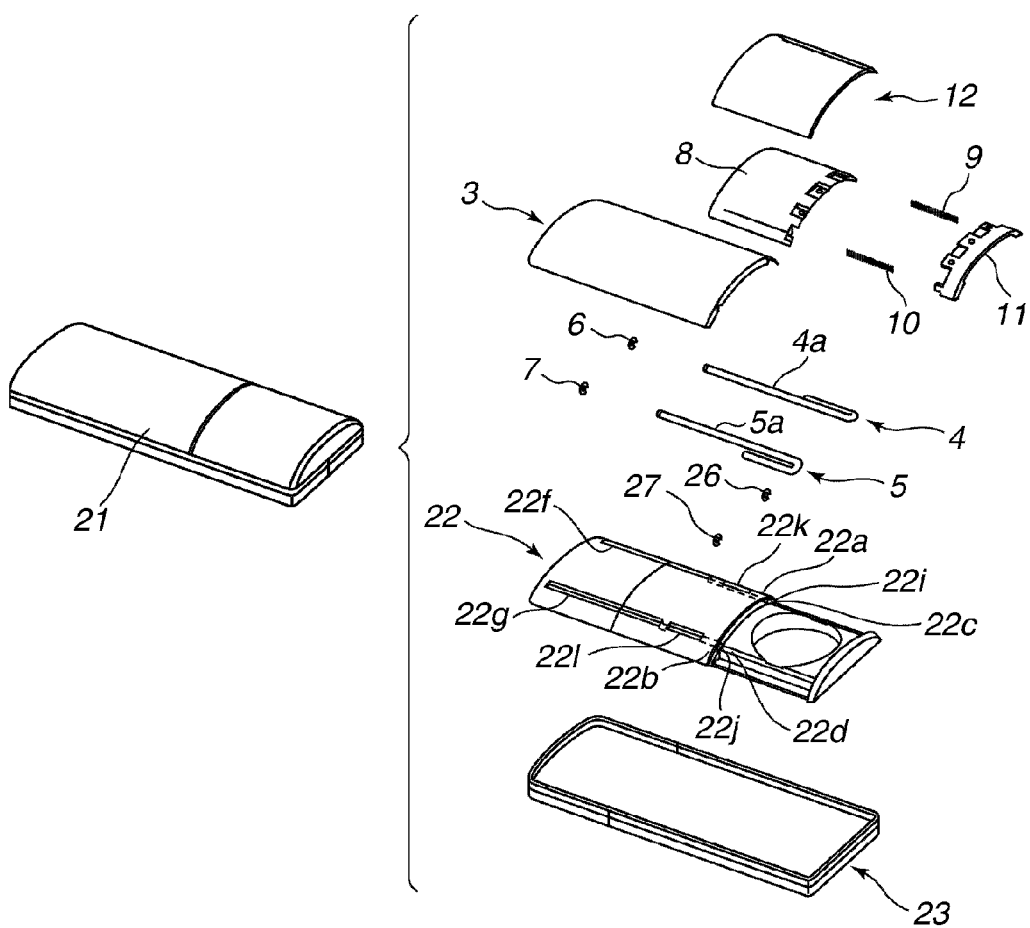
FIG. 8 is an exploded view of the second exemplary embodiment.

First, as illustrated in FIGS. 7A to 7C, through holes 22h and 23a are provided in a front cover 22 and a rear cover 23, and a button 24 is attached therein along with a spring 25. The button 24 can be pressed from a back face of the rear cover 23. The button 24 and the spring 25 configure an operation unit. When the button 24 is pressed, a pressing portion 24a presses the barrier cover 8 forward. Next, as illustrated in FIG. 8, notches 22i and 22j are provided in long-dimension bearing entrances 22c and 22d, and dust-proofing members 26 and 27 are arranged therein. The dust-proofing members 26 and 27, which are formed from a ring-shaped felt cloth, are constantly in contact with the long-dimension shaft members 4a and 5a of the shafts 4 and 5. Further, gap portions 22k and 22l are provided between the long-dimension bearings 22a and 22b. These gap portions 22k and 22l are set so that they form a gap of a predetermined size that does not come into contact with the long-dimension shaft members 4a and 5a. More specifically, the long-dimension bearings 22a and 22b support the long-dimension shaft members 4a and 5a at two locations, near the entrance and near the exit. The camera 21 also includes guide grooves 22f and 22g.

Since the remaining configuration is similar to the first exemplary embodiment, a description thereof will be omitted.

The camera 21 according to the second exemplary embodiment is thus configured as described above. Therefore, to open the barrier cover 8 of the camera 21, similar to the first exemplary embodiment, either the barrier cover 8 may be pulled in the front face direction, or the barrier cover 8 may be slid laterally from the beginning. However, even without directly operating the barrier cover 8, the barrier cover 8 can be pressed in the front face direction to open by pressing the button 24. Consequently, operability can be further improved.

Subsequently, similar to the first exemplary embodiment, the barrier cover 8 can be moved to the front face of the front metal piece 3 by laterally sliding the barrier cover 8. During this operation, since the dust-proofing members 26 and 27 are arranged at the entrance of the long-dimension bearings 22a and 22b, dust and foreign objects adhering to the long-dimension shaft members 4a and 5a can be prevented from entering the long-dimension bearings 22a and 22b, so that the sliding properties improve. Further, since the dust-proofing members 26 and 27 are formed from felt cloth, sliding properties can be further improved by wetting the cloth with a lubricant so that each time the barrier cover 8 is made to slide the long-dimension shaft members 4a and 5a of the shafts 4 and 5 are coated with the lubricant. In addition, since the gap portions 22k and 22l are provided between the long-dimension shaft members 4a and 5a so as to not come into contact with the long-dimension shaft members 4a and 5a, the contact surface area with the long-dimension shaft members 4a and 5a can be decreased, and foreign objects and sliding debris can be allowed to escape or be removed, so that the sliding properties are even further improved.

A camera 31 according to a third exemplary embodiment of the present invention will now be described. The camera 31 relates to an invention characterized by, in addition to the features of the first exemplary embodiment, features other than operation of the barrier main body, such as a switch operation associated with opening and closing of the barrier cover 8, and a latching means for supporting the barrier cover 8 in an open state. Parts that are the same as the first exemplary embodiment are denoted with the same reference numerals, and parts that are new in the third exemplary embodiment are denoted with new reference numerals.

Figure 9:
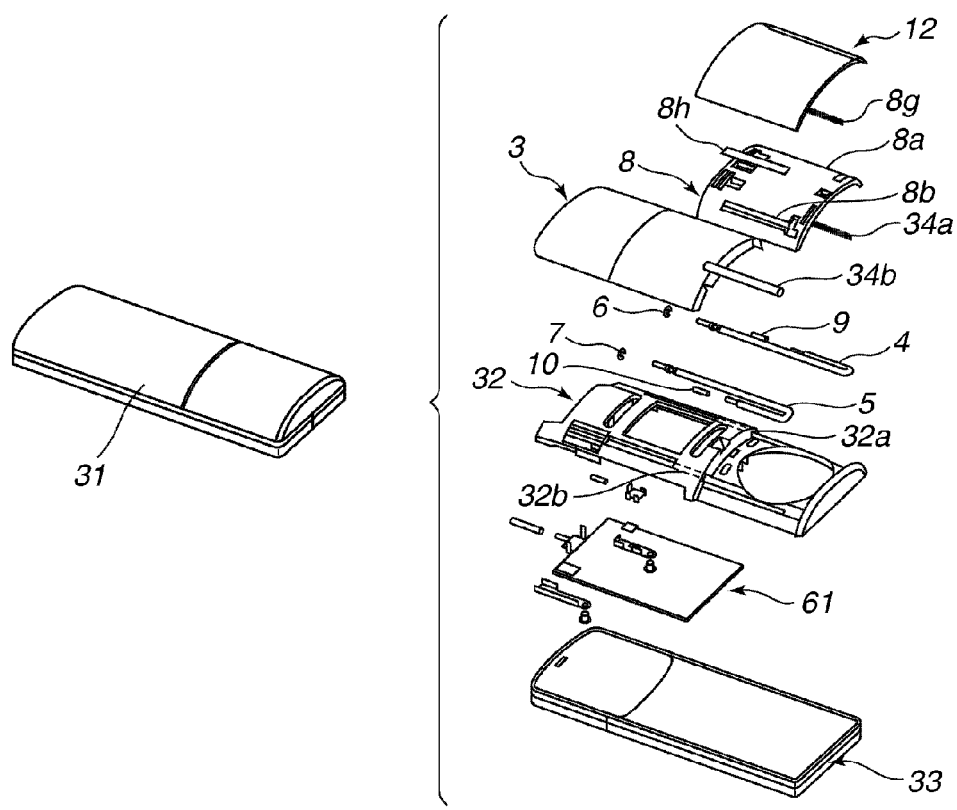
FIG. 9 is an exploded view of a camera according to a third exemplary embodiment.

FIG. 9 is an enlarged view of the camera 31 according to the third exemplary embodiment. First, a front cover 32 that covers the front half of the camera 31 is formed from a resin material. Further, two long-dimension bearings 32a and 32b for a shaft to pass through are formed in a similar manner as the front cover 2 according to the first exemplary embodiment. In addition, the front metal piece 3, which is formed by drawing sheet metal of stainless steel, for example, is adhered to and made to cover the front face of the front cover 32.

Figure 10:
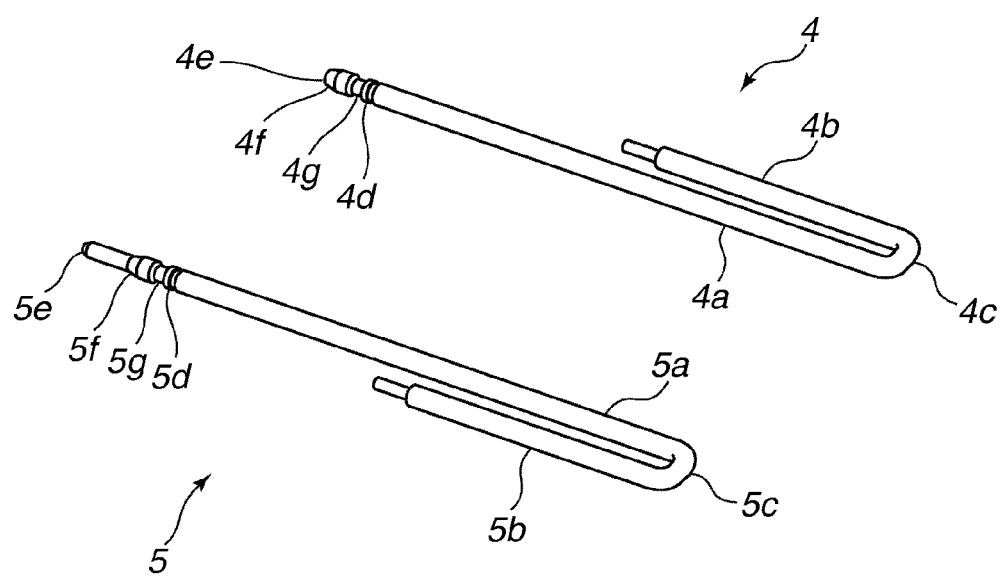
FIG. 10 is a perspective view illustrating a shaft in detail.

FIG. 10 illustrates the two shafts 4 and 5 in detail. The two shafts 4 and 5 are formed by bending a rod material having a circular cross-section at folded-back sections 4c and 5c to form a shape that is roughly like the letter "J", so that the long-dimension shaft members 4a and 5a and short-dimension shaft members 4b and 5b are positioned parallel to each other. Near the tips 4e and 5e of the long-dimension shaft members 4a and 5a are formed fastening grooves 4d and 5d, and small-diameter faces 4g and 5g, which are one step narrower than the diameter of beveled faces 4f and 5f and the shafts 4 and 5. However, the shape of the two shafts 4 and 5 is not exactly the same. The length of one of the tips 4e and 5e of the long-dimension shaft members 4a and 5a is longer than the other. The lengths are made different in order to desirably control the operation timing of the below-described switch.

Next, the barrier cover 8 that covers the front face of the lens aperture will be described. The barrier cover 8, which is formed from an elastic resin material, is provided with two short-dimension bearings 8a and 8b. Springs 9 and 10 having the same shape and the short-dimension shaft members 4b and 5b of the shafts 4 and 5 are inserted in the short-dimension bearings 8a and 8b. Since the shafts 4 and 5 come off from the barrier cover 8 if pressed on by the springs 9 and 10, to prevent this, in the first exemplary embodiment the stopper member 11 was attached.

However, in the third exemplary embodiment, as illustrated in FIG. 16A, stopper strength is increased by forming stopper members 8e and 8f integrally with the barrier cover 8. However, by integrally forming the stopper members 8e and 8f with the barrier cover 8, the short-dimension bearings 8a and 8b provided in the barrier cover 8 need to be removed from the mold in the arrow direction illustrated in FIG. 16B. Consequently, the short-dimension bearings 8a and 8b can only be formed in a semicircular arc shape, so that the bearing effect deteriorates. To prevent this, a configuration is employed that guides the remaining portion of the semicircular arc shape with auxiliary bearings 8g and 8h.

These auxiliary bearings 8g and 8h are integrally fixed to the barrier cover 8 by adhesion. Further, sliding members 34a and 34b are pasted on a face on an inner side of the barrier cover 8 to make it more difficult for sliding scratches to form on the front metal piece 3 when opening and closing the barrier cover 8. The sliding members 34a and 34b are formed from a material such as felt or a high molecular polymer to increase the anti-scratching effect. The barrier metal piece 12, which is formed by drawing sheet metal of stainless steel, for example, is adhered to and made to cover the front face of the barrier cover 8.

Finally, the camera 31 includes a rear cover 33, which is combined with the front cover 32 and covers the rear half section of the camera 31. Although a lens unit and other structural parts configuring the camera 31 are housed in that section, a description of those units will be omitted here.

FIGS. 11A and 11B are enlarged exploded views of the camera 31 according to the third exemplary embodiment from two angles. Two spring housing portions 32c and 32d are formed in a front cover 32. Springs 42 and 52 are respectively housed in the spring housing portions 32c and 32d along with sliders 41 and 51, which are intermediate members. Further, cover members 43 and 53, which make sure that the springs 42 and 52 and the sliders 41 and 51 do not fall out, cover the spring housing portions 32c and 32d by engaging with screws 44 and 54 and a claw. At this point, the two sliders 41 and 51 are slidably attached while being urged in the direction of the shafts 4 and 5 by the two springs 42 and 52. In addition, protruding members 32e and 32f and 32g and 32h are formed on the front cover 32. Although described in more detail below, these protruding members are formed so that each pair engages with one of the two shafts 4 and 5 respectively according to straight-line movement of the two shafts 4 and 5.

Next, in FIGS. 11A and 11B, a wiring board 61 is illustrated in a see-through state. Two switches 62 and 63 are mounted on the wiring board 61. These two switches 62 and 63 are moved in conjunction with straight-line movement of the shafts 4 and 5 to execute ON/OFF operation via the sliders 41 and 51. More specifically, switch on and off of the two switches 62 and 63 is executed in conjunction with the opening and closing operation of the barrier cover 8. The camera 31 according to the third exemplary embodiment is thus configured as described above.

Next, operation of the respective members that are moved in conjunction with the opening and closing operation of the barrier cover 8 and the state of the switches 62 and 63 will be described. Since the operation of the barrier cover 8 per se is the same as described in the first exemplary embodiment, a description thereof will be omitted here.

Figure 13A:
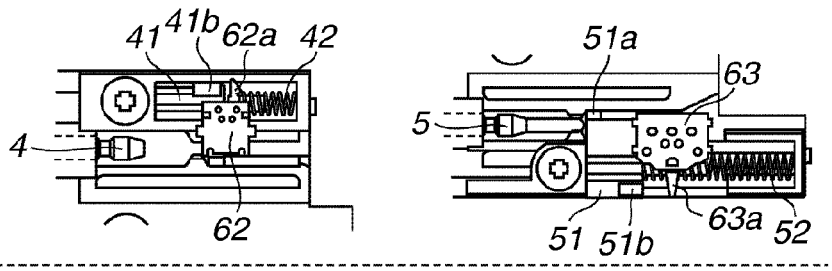
FIGS. 13A, 13B, 13B', 13C, 13C' and 13D illustrate state changes in the operation of a switch.

First, when the movement of the barrier cover 8 in the opening direction is started from a state in which the barrier cover 8 is closed, the barrier cover 8 reaches the state illustrated in FIG. 12. At this point, the barrier cover 8 is about ¾ open, and the tips 4e and 5e of the long-dimension shaft members 4a and 5a of the shafts 4 and 5 are near the sliders 41 and 51. In this state, neither of the tips 4e or 5e of the shafts 4 and 5 have pressed the sliders 41 or 51, so that the two switches are both still in an OFF state. This state is the same as the state illustrated in FIG. 13A.

Figure 13B:
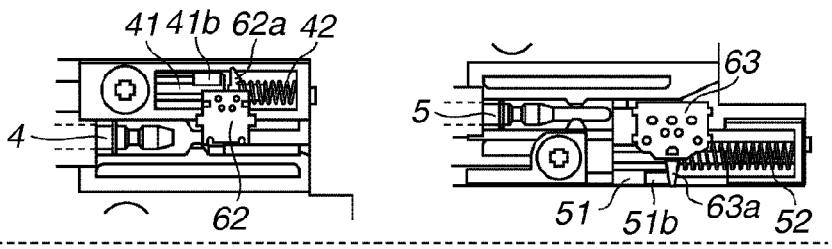
Figure 13C:
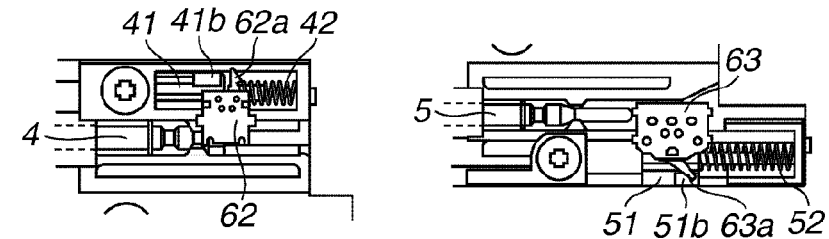
Figure 13D:
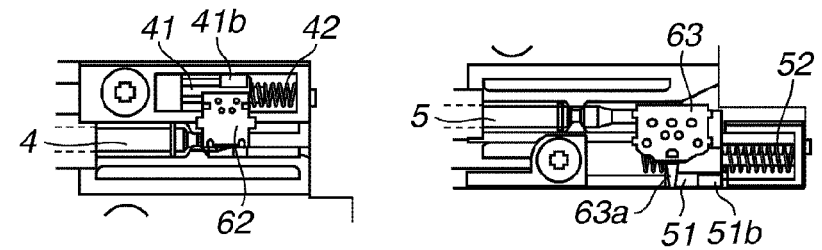
Figure 13C:
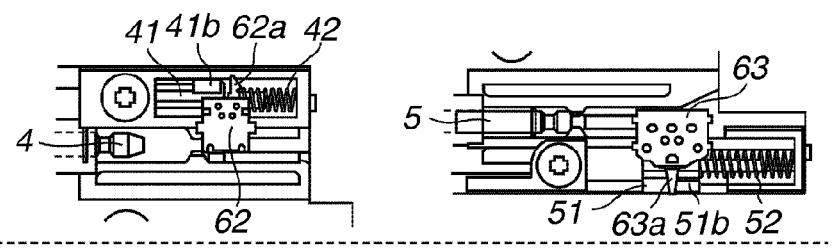
Figure 13B:
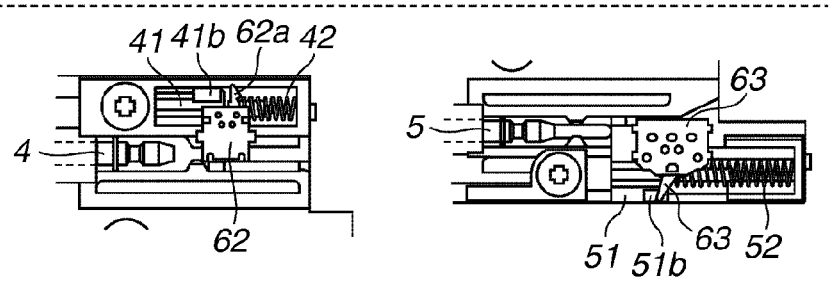
Figure 14:
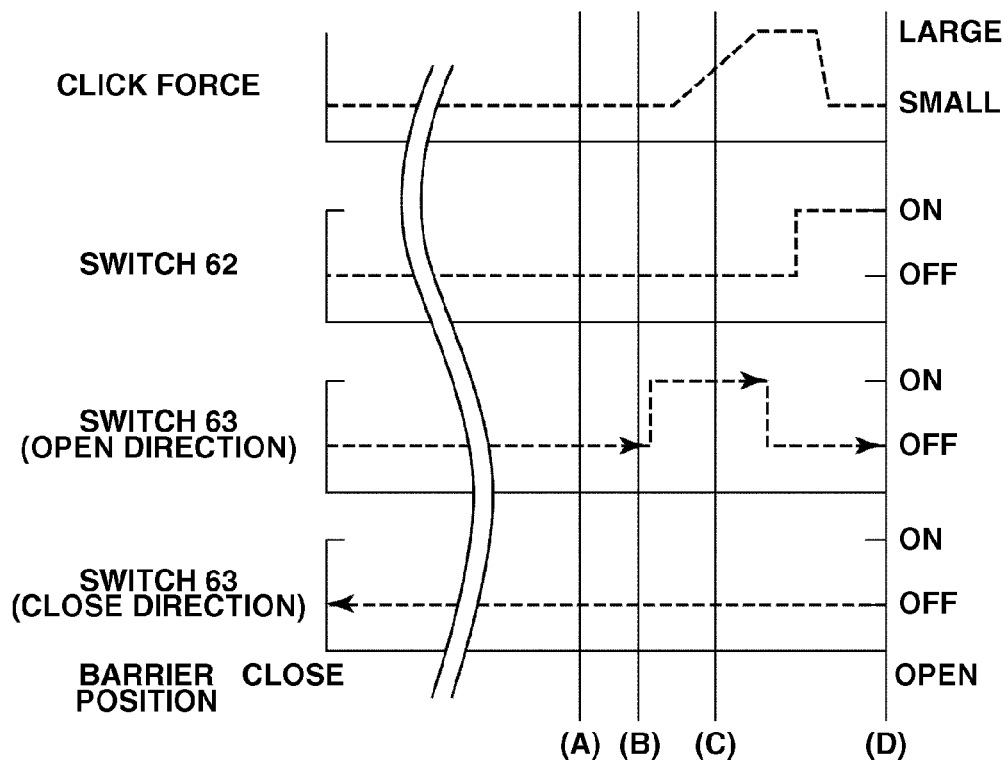
FIG. 14 is a timing chart illustrating the operation timing of a switch.

FIG. 14 illustrates the relationship between the ON/OFF state of the two switches 62 and 63 and the open amount of the barrier cover 8. In FIG. 14, position (A) corresponds to the state of FIG. 13(A). Similarly, positions (B) to (D) correspond to the states of FIGS. 13(B) to 13(D). Based on FIG. 14, it can be seen that at position (A) the two switches 62 and 63 are OFF. Further, while the barrier cover 8 is opening from a completely closed state to about ¾ open, only the shafts 4 and 5 are moving in tandem in a straight line, so that no actions have been performed on the internal parts before this point.

From this state, when the barrier cover 8 is opened further and reaches the position illustrated in FIG. 13B, the tip 4e of the shaft 4 still has not reached the slider 41, so the switch 62 is still in an OFF state. On the other hand, since the tip 5e of the other shaft 5 is longer than the tip 4e of the shaft 4, the tip 5e has reached a shaft abutment face 51a of the slider 51. Consequently, the slider 51 is moved in the right direction in FIGS. 13A to 13B against urging by the spring 52. However, in this state, a rib 51b extending from the slider 51 has just started to come into contact with a knob 63a of the switch 63, so that the switch 63 is still in an OFF state. From FIG. 14, it can also be seen that at position (B) the two switches 62 and 63 are both still in an OFF state.

When the barrier cover 8 is opened even further and reaches the state illustrated in FIG. 13C, the tip 4e of the shaft 4 finally starts to come into contact with a shaft abutment face 41a of the slider 41. However, in this state, a rib 41b extending from the slider 41 is not in contact with a knob 62a of the switch 62, so that the switch 62 is still in an OFF state. On the other hand, the tip 5e of the other shaft 5 pushes the shaft abutment face 51a of the slider 51 further in the right direction in FIGS. 13A to 13C. At a predetermined timing while the barrier cover 8 is opening, the knob 63a of the switch 63 is toppled over by the rib 51b extended from the slider 51. Consequently, the switch 63 is switched ON.

When the barrier cover 8 is opened even further from the state illustrated in FIG. 13C and reaches the position illustrated in FIG. 13D, the tip 4e of the shaft 4 reaches the shaft abutment face 41a of the slider 41. Consequently, the slider 41 is moved in the right direction in FIGS. 13A to 13D against urging by the spring 52. At this point, the rib 41b extending from the slider 41 has toppled the knob 62a of the switch 62, so that the switch 62 is in an ON state. On the other hand, the tip 5e of the other shaft 5 moves the slider 51 further to the right from the state illustrated in FIG. 13C. At this point, the rib 51b extending from the slider 51 has gone past the knob 63a of the switch 63, so the knob 63a of the switch 63 reverts to an intermediate position, and the switch 63 again is in an OFF state. Further, at this position, the face on the opposite side of the face abutting the shafts 4 and 5 of the shaft abutment faces 41a and 51a of the two sliders 41 and 51 is abutting the front cover 32, so the barrier cover 8 cannot open any further than this. Specifically, this means that the barrier cover 8 is fully open.

Next, the behavior of the switches 62 and 63 when the barrier cover 8 is closed from a fully open state will be described. The actual operations at this time are illustrated in FIGS. 13A to 13D in order of FIGS. 13D, 13C', 13B', and 13A. FIGS. 13C' and 13B' mentioned here illustrate a state in which the barrier cover 8 is at the same position as in FIGS. 13C and 13B. From these diagrams, it can be seen that the operation of switch 62 is the complete reverse of the operations performed when the barrier cover 8 was opening. Therefore, in the state illustrated in FIG. 13C', the rib 41b of the slider 41 has started to retreat from the knob 62a of the switch 62, so that the switch 62 that was ON when the barrier cover 8 was fully open is OFF. Subsequently, in FIGS. 13B' and 13A, the barrier cover 8 is closed while the switch 62 is maintained in an OFF state.

When trying to move the barrier cover 8 in a closing direction from this state, because the protruding members 32e and 32f and 32g and 32h have to overcome the outer form of the shafts 4 and 5, a load is applied on the protruding members in the direction of closing the barrier cover 8. FIG. 14 illustrates this click force. In FIG. 14, when moving from (D), which is a state in which the barrier cover 8 is fully open, toward (C), which is when the barrier cover 8 has begun to close a little, the click force is large, which corresponds to the above-described load. Based on this load, a supporting force for a state in which the barrier cover 8 is open can be produced. Further, in the third exemplary embodiment, care is taken so that the opening and closing operation feel of the barrier cover 8 is not harmed by matching the timing of the two shafts 4 and 5 so that a uniform load is placed on the shafts 4 and 5.

As described above, the switch operations required to switch from a non-usage state to a usage state of the camera 31, and the reverse operations therefor, i.e., output of the signals instructing startup and stoppage of the main power supply, and the extension and retraction of the lens unit are performed based on only opening and closing of the barrier cover 8. Further, since the switch operations and the supporting mechanism of the barrier cover 8 are configured via the just the tips of the shafts, the coupling section between the main body of the camera 31 and the barrier unit formed from the barrier cover 8 is configured just by the two shafts 4 and 5. There is no need to provide separate parts just for the switch operations. Moreover, since there is no need to provide unnecessary protrusions or holes on the exterior, deterioration in the appearance level can also be suppressed. In addition, since the switches 62 and 63 are each individually operated by the respective tips of two shafts, it is easy to set desired switch operation timing.

Next, the switch 63 will be described. FIG. 14 also illustrates the state of the switch 63 when the barrier cover 8 is closed, as can be seen from FIG. 14, the switch 63 is always in an OFF state when closing the barrier cover 8. This is because when the barrier cover 8 was fully open, the rib 51b extended from the slider 51 had gone past the knob 63a of the switch 63. Consequently, when closing the barrier cover 8, as illustrated in FIGS. 13C' and 13B', the rib 51b extended from the slider 51 topples the knob 63a of the switch 63 from the opposite side. Due to this difference, when closing the barrier cover 8, the switch 63 is configured so as not to be ON. Subsequently, after the state illustrated in FIG. 13A, i.e., the state at which the rib 51b extended from the slider 51 has gone past the knob 63a of the switch 63, and the knob 63a of the switch 63 has returned to an intermediate position, the switch 63 is OFF until the barrier cover 8 is closed.

Although a configuration was described in which the tips 4e and 5e of the shafts 4 and 5 operate the switches 62 and 63 via the sliders 41 and 51, respectively, this is so as to reliably operate the switches 62 and 63 by the action of the tips 4e and 5e of the shafts 4 and 5. The reason for this is because if the tips 4e and 5e of the shafts 4 and 5 are used to directly operate the knobs 62a and 63a of the switches 62 and 63, these parts may fail to contact each other since the tips 4e and 5e of the shafts 4 and 5 are small and round, and the knobs 62a and 63a of the switches 62 and 63 are also small. Based on the above configuration, the reliability of the operation of the switches 62 and 63 can be increased.

Further, as a means for making the operation timing of the two switches 62 and 63 different from each other, it can be understood from the above description that this could be achieved by changing the lengths of the tips 4e and 5e of the shafts 4 and 5. However, the ON timing of the switches 62 and 63 can also be made to be different by changing the position of the sliders 41 and 51 or the position of the switches 62 and 63 with the shafts 4 and 5 having the same shape. In this case, since this operation needs to be tailored to the longer shaft, both the shafts become longer, so that there is still the problem that the camera 31 becomes larger. Thus, this technique is not employed in the third exemplary embodiment of the present invention. If there is some leeway in the size of the camera 31, obviously the two shafts may be standardized.

These two switches 62 and 63, which switch between ON and OFF in conjunction with the opening and closing operation of the barrier cover 8, are mounted on the wiring board 61, and output a signal to a (not illustrated) camera system. As described above, the operation timing for switching these switches 62 and 630N and OFF is illustrated in FIG. 14. However, causing this operation timing to occur is important. The output signals of the switches 62 and 63 and the timing of such signals will now be described below.

When opening the barrier cover 8 from a closed state, as described above, the switch 63 switches ON before the switch 62. Further, this switch 63 is a main power switch, so that by switching the switch 63ON the camera system starts up. Specifically, even if the switch 62 was switched ON before the switch 63, the camera 31 system would no start up, and thus the output signal from the switch 62 would not be recognized. Consequently, the configuration is designed so that the switch 63 is switched ON before the switch 62.

However, on the other hand, since current is flowing through the camera system while the switch 63 is ON, the switch 63 needs to be OFF when the barrier cover 8 is fully open. Consequently, the configuration is designed so that the switch 63 is switched OFF at the position illustrated in FIG. 13D. Based on this configuration, the problem of current continuing to flow in the camera system can be avoided.

Figure 15:
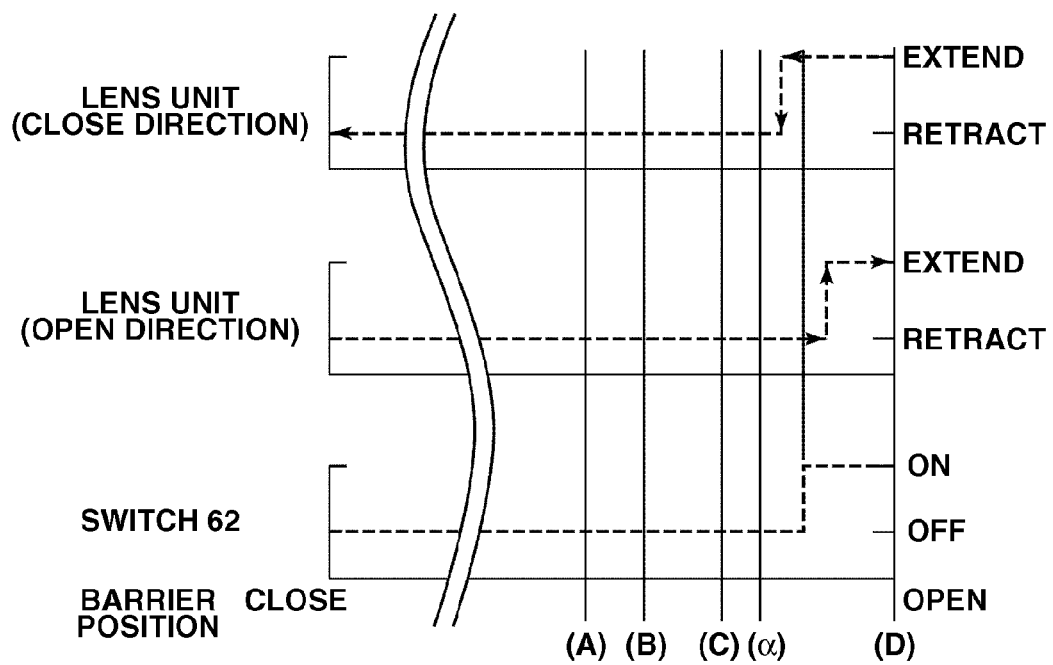
FIG. 15 is a timing chart illustrating the operation timing of a switch and a lens unit.

The other switch 62 transmits the fact that the barrier cover 8 is fully open or almost fully open to the camera system, which then instructs a (not illustrated) retractable lens barrel that can extend and retract to extend to an extended position, which is a usage state, from a retracted state, which is a storage state. FIG. 15 illustrates the ON and OFF states of the switch 62 and the operation timing for extension and retraction of the lens unit. In FIG. 15, position (a) is the open amount at which the barrier cover 8 starts to no longer suffer from interference from the extension of the lens unit. When the barrier cover 8 is open from this position and further, there is no interference between the lens unit and the barrier cover 8 even if the lens unit is extended.

The switch 62 is switched ON at a timing that is after the position ($\alpha$) in FIG. 15. When the signal input from the switch 62 is received, the lens unit is extended. Consequently, a collision between the barrier cover 8 and the lens unit caused by the lens unit being extended before the barrier cover 8 is opened can be avoided.

On the other hand, when the barrier cover 8 is closed from a fully open state, first, the switch 62 switches from an ON state to an OFF state. The camera system receives this signal input, and houses the lens unit in the retracted position. At this point, the barrier cover 8 is still not closed to the position ($\alpha$) in FIG. 15. Consequently, a collision between the barrier cover 8 and the lens unit caused by the barrier cover 8 being closed before the lens unit has been collapsed can be avoided. Further, the camera system receives the signal that the switch 62 has switched to an OFF state, then starts a shutdown operation and the main power of the camera transits to OFF state.

Next, as illustrated in FIG. 13B', although the knob 63a of the switch 63 has been toppled over from the opposite direction from that when opening the barrier cover, as described above, the switch 63 is configured not to be switched ON. Even if some other signal is output, because the power has already been shut down, that output signal will not be recognized by the camera system. More specifically, when closing the barrier cover 8, the configuration can be designed only by the signal from the switch 62.

Next, a supporting mechanism when the barrier cover 8 is in an open state will be described. As stated above and as illustrated in FIGS. 11A, 11B, and 12, two pairs of protruding members, 32e and 32f and 32g and 32h, are provided on the front cover 32. When the barrier cover 8 is fully open, i.e., in the state illustrated in FIG. 13D, two pairs of protruding members, 32e and 32f, engages with the small-diameter faces 4g, which is one step narrower than the diameter of the shaft 4. Further, the other pair of protruding members, 32g and 32h, engages with the small-diameter faces 4g, which is one step narrower than the diameter of the other shaft 5.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-096225 filed Apr. 22, 2011 and No. 2011-096226 filed Apr. 22, 2011, which are hereby incorporated by reference herein in their entirety.

What is claimed is:
1. An electronic device comprising:
a front cover which covers a front face of an apparatus;
a barrier cover which is movable between an open state and a close state, wherein if the barrier cover is in the open state, the barrier cover overlaps the front cover and, wherein if the barrier cover is in the closed state, the front cover and barrier cover form a continuous face;
two shafts which attaches the barrier cover to the front cover so that the barrier cover moves in a forward direction and in a lateral direction, wherein each of the two shafts has a long part and a short part that are parallel to each other, and a folded-back section which connects the long and short parts, and wherein the one of the two shafts is positioned at an upper edge of the front cover and the barrier cover, and the other of the two shafts is positioned at a lower edge of the front cover and the barrier cover; and a locking unit configured to lock the barrier cover in the open state.

2. The electronic device according to claim 1, wherein the long part is supported rotatably and slidably in the lateral direction on a long part bearing portion of the front cover, wherein the short part is supported rotatably on a short part bearing portion of the barrier cover, and wherein the long part and short part guide the barrier cover from the closed state to the open state by rotating about the long part so that the short part protrude out from a front face of the front cover and moving by lateral slide of the long parts with respect to the long part bearing portion.

3. The electronic device according to claim 2, wherein the short part of the shafts are attached to the short part bearing portions of the barrier cover, wherein two springs are provided in the short part bearing portions respectively, wherein if the barrier cover is in the closed state, the springs are charged respectively, and wherein if the barrier cover is in the open state, urging forces of the springs are released respectively.

4. The electronic device according to claim 2, further comprising:
two dust-proofing members which are arranged at an entrance of the long part bearing portions of the front cover respectively, wherein dust-proofing members are in contact with the long part of the shafts respectively.

5. The electronic device according to claim 4, wherein the dust-proofing members are lubricated with a lubricant.

6. The electronic device according to claim 1, wherein the locking unit has a spring which urges the barrier cover toward the open state, and a stopper member which contacts the barrier cover in the open state, and wherein if the barrier cover which is in the open state moves against urging force from the spring, the locking unit releases locking of the barrier cover.

7. The electronic device according to claim 1, wherein if the barrier cover is in the closed state, the front cover and the barrier cover are in contact at an inclined surface that is inclined with respect to the front face of the apparatus, and wherein if the barrier cover moves from the closed state, the barrier cover moves in the forward direction along the inclined surface.

8. The electronic device according to claim 1, further comprising:
a switch which detects movement of the long part of the shaft.

9. The electronic device according to claim 8, further comprising:
a click force providing unit which provides click force in a case when the barrier cover is in open state,
wherein the switch detects whether a tip of the long part of one of the two shafts reaches a predetermined position, and
wherein the click force providing unit provides maximum click force after the switch detects that the tip of the long part reaches the predetermined position.

10. The electronic device according to claim 9,
wherein a small-diameter portion is formed on the tip of the long part of one of the two shafts,
wherein the click force providing unit has a protruding portion arranged on the front cover along a movement path of the tip of the long part, and
wherein the click force is provided when the protruding portion engages with the small-diameter portion.

11. The electronic device according to claim 1, further comprising:
a first switch which detects movement of the long part of one of the two shafts;
a second switch which detects movement of the long part of the other of the two shafts,
wherein a detection timing of the first switch and a detection timing of the second switch are different from each other.

12. The electronic device according to claim 11, wherein length of the long part of one of the two shafts and length of the long part of the other of the two shafts are different from each other.

13. An electronic device comprising:
a cover member which provides a front face of the apparatus;
a barrier member which is movable between an open state and a close state;
a first shaft member which has a first long part and a first short part that are parallel to each other, and a first folded-back part which connects the first long part and the first short part; and
a second shaft member which has a second long part and a second short part that are parallel to each other, and a second folded-back part which connects the second long part and the second short part,
wherein the first long part of the first shaft member and the second long part of the second shaft member are engaged with the cover member,
wherein the first short part of the first shaft member and the second short part of the second shaft member are engaged with the barrier member,
wherein the first shaft member is arranged at one side of the electronic device, and the second shaft member is arranged at the other side of the electronic device,
wherein in a case when the barrier member is in the close state, the cover member and barrier member are formed a continuous face, and
wherein in a case when the barrier member is in the open state, the cover member and barrier member are overlapped each other.

14. The electronic device according to claim 13,
wherein the barrier member is moved form the close state to an intermediate state whereby the barrier member is moved toward a direction which is far from a front surface of the cover member when the barrier member is in the close state, and
wherein the barrier member is moved from the intermediate state to the open state whereby the barrier member is slid along the first long part of the first shaft member and the second long part of the second shaft member.

15. The electronic device according to claim 13, further comprising:
a stopper member which restricts movement of the barrier member in the close state,
wherein in a case when the barrier member is in the close state, a first portion of the stopper member contacts at least one of the first shaft member and the second shaft member, and
wherein in a case when the barrier member is in the open state, a second portion of the stopper member contacts at least one of the first shaft member and the second shaft member, and
wherein the first portion of the stopper member and the second portion of the stopper member are different from each other.

16. The electronic device according to claim 13, further comprising:
an urging member which urges at least one of the first short part of the first shaft member and the second short part of the second shaft member, and wherein in a case when the barrier member is in the close state, the urging member is charged.

17. The electronic device according to claim 13, further comprising:
a position detector which detects position of the barrier member,
wherein the position detector detects position of the first long part or position of the second long part.

18. The electronic device according to claim 13,
wherein the cover member has a first long part engagement portion and a second long part engagement portion,
wherein the first long part of the first shaft member is engaged with the first long part engagement portion so that the first long part of the first shaft member is rotatably and slidably,
wherein the second long part of the second shaft member is engaged with the second long part engagement portion so that the second long part of the second shaft member is rotatably and slidably,
wherein the barrier member has a first short part engagement portion and a second short part engagement portion,
wherein the first short part of the first shaft member is engaged with the first short part engagement portion so that the first short part of the first shaft member is rotatably and slidably, and
wherein the second short part of the second shaft member is engaged with the second short part engagement portion so that the second short part of the second shaft member is rotatably and slidably.

19. electronic device according to claim 18,
wherein in a case when the barrier member is in the close state, the first short part engagement portion is located outside from the first long part engagement portion of the cover member and the second short part engagement portion is located outside from the second long part engagement portion of the cover member.

20. The electronic device according to claim 18,
wherein the barrier member is moved form the close state to an intermediate state whereby the first long part of the first shaft member is rotated in the first long part engagement portion and the second long part of the second shaft member is rotated in the second long part engagement portion so that the barrier member is moved toward a direction which is far from a front surface of the cover member when the barrier member is in the close state, and
wherein the barrier member is moved form the intermediate state to the open state whereby the first long part of the first shaft member is slid in the first long part engagement portion and the second long part of the second shaft member is slid in the second long part engagement portion so that the barrier member is slid along the first long part of the first shaft member and the second long part of the second shaft member.

21. The electronic device according to claim 18, further comprising:
a stopper member which restricts movement of the barrier member in the close state,
wherein in a case when the barrier member is in the close state, a first portions of the stopper member contact the first shaft member and the second shaft member, and
wherein in a case when the barrier member is in the open state, a second portions of the stopper member contact the first shaft member and the second shaft member, and
wherein the first portions of the stopper member and the second portions of the stopper member are different from each other.

22. The electronic device according to claim 18, further comprising:
an first urging member which is arranged in the first short part engagement portion,
an second urging member which is arranged in the second short part engagement portion, and
wherein in a case when the barrier member is in the close state, the first urging member and the second urging member is charged.

* * * * *